(12) United States Patent
Bekircan

(10) Patent No.: US 10,371,207 B2
(45) Date of Patent: Aug. 6, 2019

(54) ROLLER BEARINGS

(71) Applicant: Claverham Limited, Shirley, Solihull (GB)

(72) Inventor: Suat Bekircan, Bath (GB)

(73) Assignee: CLAVERHAM LTD., Bristol (GB)

( * ) Notice: Subject to any disclaimer, the term of this patent is extended or adjusted under 35 U.S.C. 154(b) by 0 days.

(21) Appl. No.: 15/964,136

(22) Filed: Apr. 27, 2018

(65) Prior Publication Data

US 2018/0347628 A1    Dec. 6, 2018

(30) Foreign Application Priority Data

Jun. 2, 2017   (EP) ..................................... 17174351

(51) Int. Cl.
| | |
|---|---|
| *F16C 33/36* | (2006.01) |
| *F16C 19/26* | (2006.01) |
| *F16C 23/08* | (2006.01) |
| *F16C 33/58* | (2006.01) |

(Continued)

(52) U.S. Cl.
CPC ............ *F16C 33/366* (2013.01); *F16C 19/26* (2013.01); *F16C 19/364* (2013.01); *F16C 23/086* (2013.01); *F16C 33/36* (2013.01); *F16C 33/585* (2013.01); *F16C 33/541* (2013.01)

(58) Field of Classification Search
CPC ....... F16C 19/26; F16C 23/082; F16C 23/084; F16C 23/086; F16C 23/088; F16C 33/36; F16C 33/565; F16C 33/585; F16C 33/6696
See application file for complete search history.

(56) References Cited

U.S. PATENT DOCUMENTS

| | | | | |
|---|---|---|---|---|
| 1,152,663 A | * | 9/1915 | Shafer .................. | F16C 23/086 |
| | | | | 384/560 |
| 1,263,454 A | * | 4/1918 | Meier .................... | F16C 27/04 |
| | | | | 384/581 |

(Continued)

FOREIGN PATENT DOCUMENTS

| | | |
|---|---|---|
| CN | 204493452 U | 7/2015 |
| DE | 19928246 A1 | 1/2000 |

(Continued)

OTHER PUBLICATIONS

Extended European Search Report for International Application No. 17174351.1 dated Jul. 12, 2017, 8 pages.

*Primary Examiner* — Phillip A Johnson
(74) *Attorney, Agent, or Firm* — Cantor Colburn LLP

(57) ABSTRACT

A roller bearing comprises inner and outer rings defining a toroidal inner raceway rotatable about a bearing axis (A). A plurality of concave rolling elements is arranged in a single row between the outer and inner rings. Each of the plurality of concave rolling elements is a symmetrical cylindrical roller having circular ends, a roller axis passing through the center of the circular ends, and a concave side profile that extends continuously between the circular ends. The toroidal inner and outer raceways each have a convex race surface that continuously engages the concave side profile between the circular ends of each concave rolling element with a first radius and extends axially beyond the circular ends of each concave rolling element with a second radius that is less than the first radius.

10 Claims, 5 Drawing Sheets

(51) Int. Cl.
    *F16C 19/36*     (2006.01)
    *F16C 33/54*     (2006.01)

(56) References Cited

U.S. PATENT DOCUMENTS

| | | | |
|---|---|---|---|
| 1,787,214 A * | 12/1930 | Shafer | F16C 19/36 |
| | | | 384/560 |
| 8,061,903 B2 | 11/2011 | Kolar | |
| 9,561,845 B2 | 2/2017 | Habibvand et al. | |
| 2005/0058382 A1 | 3/2005 | Williams | |
| 2015/0260225 A1 * | 9/2015 | Habibvand | F16C 33/36 |
| | | | 384/568 |

FOREIGN PATENT DOCUMENTS

| | | |
|---|---|---|
| DE | 19964390 B4 | 3/2006 |
| FR | 506483 A | 8/1920 |
| FR | 507359 A | 9/1920 |
| JP | S5943843 A | 3/1984 |
| JP | 2003148486 A | 5/2003 |

\* cited by examiner

ROLLER BEARINGS

FOREIGN PRIORITY

This application claims priority to European Patent Application No. 17174351.1 filed Jun. 2, 2017, the entire contents of which is incorporated herein by reference.

TECHNICAL FIELD

The present disclosure relates to roller bearings and methods of assembly for a roller bearing.

BACKGROUND

Roller bearings are bearings which carry a load by placing rolling elements between two bearing rings called races. The rolling elements can be balls, cylindrical rollers, spherical rollers, tapered rollers, or needle rollers. The rolling elements are usually caged to prevent the elements from rubbing against each other.

Spherical roller bearings have been in use for nearly 100 years. The basic design consists of an inner ring with two raceways inclined at an angle to the bearing axis, an outer ring with a common spherical raceway, spherical rollers, and roller cages. The so-called spherical rollers are actually barrel-shaped cylinders, i.e. cylindrical rollers having a convex side profile. More recently, a single row spherical roller bearing called a CARB (Compact self-Aligning Roller Bearing) has been available. FIG. 1 illustrates an example of a CARB, which includes a single row having radial contacts between the convex rollers and the spherical profiles of the inner and outer races. The outer ring race is a toroidal raceway with a profile radius extending beyond the centre of the bearing. The convex rollers are symmetrical, barrel-shaped cylinders. The inner race ring is shaped accordingly. Each roller is caged. Such roller bearings may allow axial displacement up to ~10% of the bearing width and can accommodate up to 0.5° of misalignment. Both angular and axial self-alignment is provided.

The present invention aims to provide an improved roller bearing and related method of assembly.

STATEMENTS

According to the present disclosure there is provided a roller bearing that includes an inner ring defining a toroidal inner raceway rotatable about a bearing axis and an outer ring defining a toroidal outer raceway rotatable about the bearing axis. The bearing also includes a plurality of concave rolling elements arranged in a single row between the outer and inner rings. Each of the plurality of concave rolling elements is a symmetrical cylindrical roller having circular ends, a roller axis passing through the centre of the circular ends, and a concave side profile that extends continuously between the circular ends, the roller axis being aligned with the bearing axis and the toroidal inner and outer raceways each have a convex race surface that continuously engages the concave side profile between the circular ends of each concave rolling element with a first radius and extends axially beyond the circular ends of each concave rolling element with a second radius that is less than the first radius.

A roller bearing as disclosed herein has all the characteristics of a CARB bearing and additional benefits. The roller axis being aligned with the bearing axis means that the roller elements are not inclined at an angle to the bearing axis as in a conventional spherical roller bearing. Such a roller bearing provides the same characteristics as a compact i.e. single row roller bearing in terms of axial displacement and self-aligning abilities. However the disclosed roller bearing can provide high load carrying capacity, the inner ring having a greater radial thickness for the inner raceway due to its convex surface profile. This increase in radial thickness makes it possible to provide a heavy interference fit between the inner ring and a rotating shaft, which can reduce relative movement between the inner race and the shaft, and hence fretting damage, often associated with high frequency of vibration and reversing high radial load cycles. Fretting promotes the onset of metal fatigue by the generation of minute cracks in the contact surfaces, which quickly promotes initiation of metal fatigue for the shaft or bearing inner race. The propagation of cracks as a consequence of this metal fatigue will ultimately lead to catastrophic failure of the shaft or bearing. Furthermore, an increased radial thickness for the inner ring will diminish stresses associated with bearing radial load. A roller bearing as disclosed is therefore ideal for high fatigue radial loading applications.

It will be appreciated that a conventional "spherical" rolling element is a symmetrical cylindrical roller having circular ends, a roller axis passing through the centre of the circular ends, and a convex side profile that extends continuously between the circular ends to define the barrel shape of the rollers. According to the present disclosure, on the other hand, the symmetrical cylindrical rollers have a concave side profile that extends continuously between the circular ends. There are no straight rolling surfaces on the rollers and no radial race surfaces on the inner or outer raceways. Rather, the race surfaces extending axially beyond the circular ends of each concave rolling element with a second, lower radius means that axial displacements can be accommodated.

The shape of the concave side profile can be optimised for maximum load transmission and lifetime. For example, the radius of curvature of the concave side profile and how it varies along the profile between the circular ends may be adjusted for different roller bearings. In a main portion of each concave rolling element, the concave side profile has a radius R that increases from a centre line of the single row of concave rolling elements towards the circular ends. It is preferable that the intersection area between the concave side profile and the circular ends is smooth in the end portions of each concave rolling element. Thus, in at least some examples, the circular ends have a diameter 2r and, in an end portion of each concave rolling element, the concave side profile has a radius R that decreases until R=r.

In many examples according to the present disclosure, the concave rolling elements are caged. The roller bearing may comprise a cage ring comprising a plurality of packets or cages to house the concave rolling elements between the outer and inner rings. For example, the cages may keep the concave rolling elements equally spaced between the inner and outer rings. A cage ring, retainer or separator can help to reduce friction, wear, and bind by preventing the rolling elements from rubbing against each other. Furthermore, a cage can help with distribution of lubrication within the bearing.

In or more examples, each cage follows the concave side profile of the concave rolling elements and has a thickness (z) defined circumferentially along the single row of concave rolling elements. The cages may therefore have a convex shape between adjacent concave rolling elements, whereas in a conventional CARB the cages may typically have concave shape between adjacent rollers in order to accommodate the barrel profile of the rollers. In at least some examples, the single row of concave rolling elements has a centre line passing circumferentially between the outer and inner rings, and the cage thickness (z) is a maximum at the centre line. This geometry is a reverse of that found in the cage ring of a conventional CARB.

A benefit of the cylindrical rollers having a concave side profile is that each cage can have an increased thickness (z) between the concave rolling elements as compared to conventional spherical rollers. A cage thickness increase of up to 15% can be obtained as compared with a conventional CARB. Increasing the cage thickness (z) provides durability to high vibration and frequently accelerated operating environments, such as is experienced by roller bearings in trains, wind turbines, or any application with start and stop of a high speed rotating shaft. The increased physical size of the cages provides a robust design for high speed applications. The cage ring may be centred on the concave rolling elements or one of the inner/outer rings e.g. for high speed applications.

In addition, or alternatively, a benefit of the cylindrical rollers having a concave side profile is that the cages can have an increased contact area with the circular ends of the concave rollers, for example a contact area increase of up to 15% as compared to conventional spherical rollers in a CARB. This provides better roller retention axially.

The cage ring may be made from metal (e.g. steel, bronze, brass), ceramics or high performance plastics materials. Steel cages may be used for high levels of vibration and at extreme temperatures.

The cage ring may be produced by machining, casting, stamping, or an additive manufacturing process.

The cages may optionally be impregnated or coated with a solid lubricant (e.g., silver, molybdenum, graphite paste, zinc nickel, etc.) to reduce friction.

In addition, or alternatively, in many examples the concave rolling elements make full contact with the race surfaces all the way along the concave side profile between the circular ends. This enables the concave rolling elements to carry more radial load than in roller bearings that provide a lubrication reservoir between one or more of the race surfaces and the rollers. In these examples it may be beneficial for the cages to carry a solid lubricant, e.g. as mentioned above.

In various examples a roller bearing as disclosed herein is a non-location bearing. A non-location bearing can accommodate thermal issues due to shaft and housing expansion or contraction.

The size and material of the cylindrical rollers may depend on their field application and operating environment. Some typical applications include rail, wind turbines, and helicopter gearbox transmission. The operating environment may feature temperatures up to 300° C. It is therefore important for the roller bearing to accommodate axial displacement.

There is also disclosed herein a method of assembly for a roller bearing comprising concave cylindrical rollers and toroidal inner and outer raceways having a convex race surface. According to the present disclosure there is provided a method of assembling a roller bearing as disclosed above, the method comprising: assembling some of the plurality of concave rolling elements inside the outer ring to form an incomplete single row of concave rolling elements defining a circumferential gap; arranging the axis of the inner ring substantially perpendicular to the axis of the outer ring and aligning the inner ring with the circumferential gap; positioning the inner ring inside the outer ring with the axis of the inner ring aligned with a diameter of the outer ring; assembling a remainder of the plurality of concave rolling elements in the circumferential gap inside the outer ring to form a complete single row of concave rolling elements; and rotating the inner ring into the plane of the outer ring and aligning the axis of the inner ring with the axis of the outer ring.

In examples of such a method, the circumferential gap is at least as wide as the inner ring. The number of concave rolling elements missing from the complete single row may be chosen to define an appropriate circumferential gap, e.g. the remainder of the plurality of concave rolling elements may comprise at least two rollers.

BRIEF DESCRIPTION OF THE DRAWINGS

One or more non-limiting examples will now be described, by way of example only, and with reference to the accompanying figures, in which:

FIG. 1b is a schematic partial top view on arrow X of FIG. 1a;

FIG. 2b is a schematic partial top view on arrow Y of FIG. 2a of the concave rolling elements and cage ring inside the roller bearing of FIG. 2a;

DETAILED DESCRIPTION

Figure 1A:
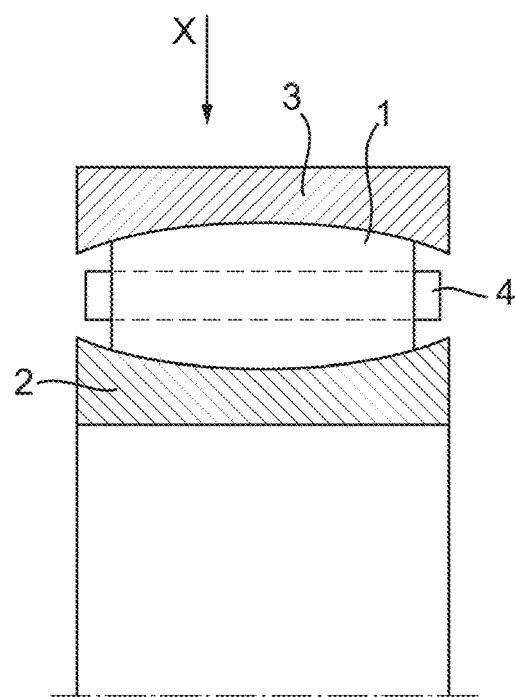
FIG. 1a is a schematic half sectional view of a spherical roller bearing according to the prior art.
Figure 1B:
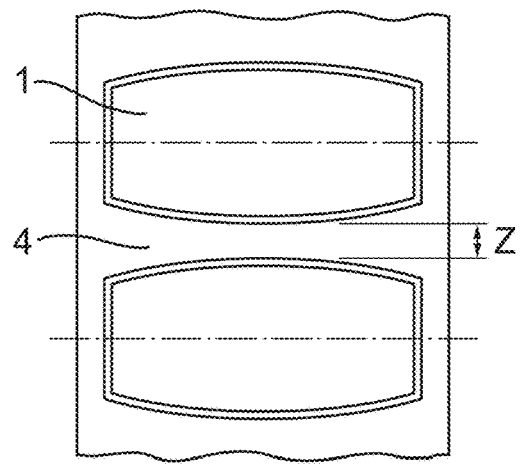

FIGS. 1a and 1b show a single row of spherical rollers 1 in the form of a cylindrical roller having a convex side profile. A roller bearing comprises an inner ring 2 and outer ring 3 having radial contact with the spherical rollers 1. A cage ring 4 includes cages that enclose each roller 1, the cages having a thickness z between adjacent rollers 1. FIG. 1b shows two adjacent rollers 1 and part of a cage ring 4 (note the inner and outer rings have been omitted for clarity). A roller bearing e.g. CARB having this construction is self-aligning and used mainly for radial loads.

Figure 2A:
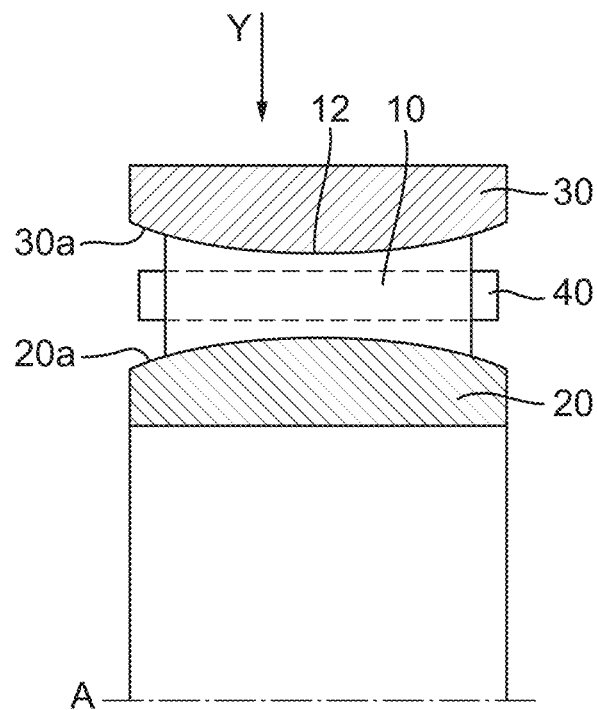
FIG. 2a is a schematic half sectional view of a roller bearing according to an example of the present disclosure.

FIG. 2a shows a roller bearing comprising an inner ring 20 defining a toroidal inner raceway rotatable about a bearing axis A and an outer ring 30 defining a toroidal outer raceway rotatable about the bearing axis A. The toroidal raceways are seen in FIG. 3. A plurality of concave rolling elements 10 is arranged in a single row between the outer and inner rings 20, 30. It can be seen that each of the plurality of concave rolling elements 10 is a symmetrical cylindrical roller having a concave side profile 12, hereinafter referred to as a concave roller. The concave roller 10 is aligned with the bearing axis A. It can also be seen that the outer and inner rings 20, 30 each have a convex race surface 20a, 30a that continuously engages the concave side profile 12 of the concave rollers 10 with a first radius, the convex race surface 20a, 30a extending axially beyond the ends of the rollers 10 with a second radius that is less than the first radius. This enables axial displacement to be accommodated.

Figure 2B:
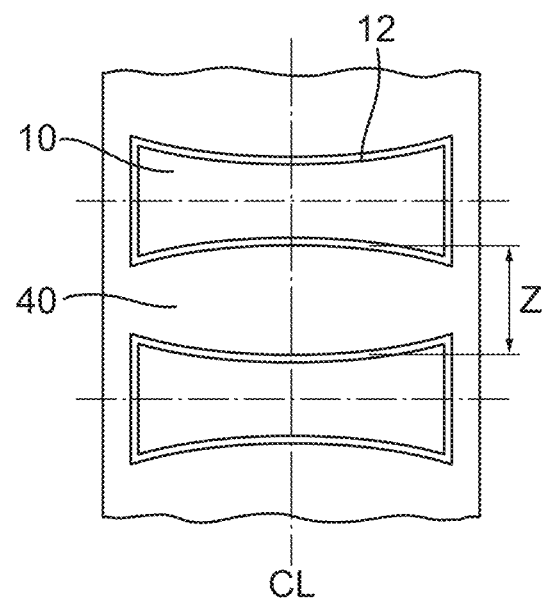
Figure 2C:
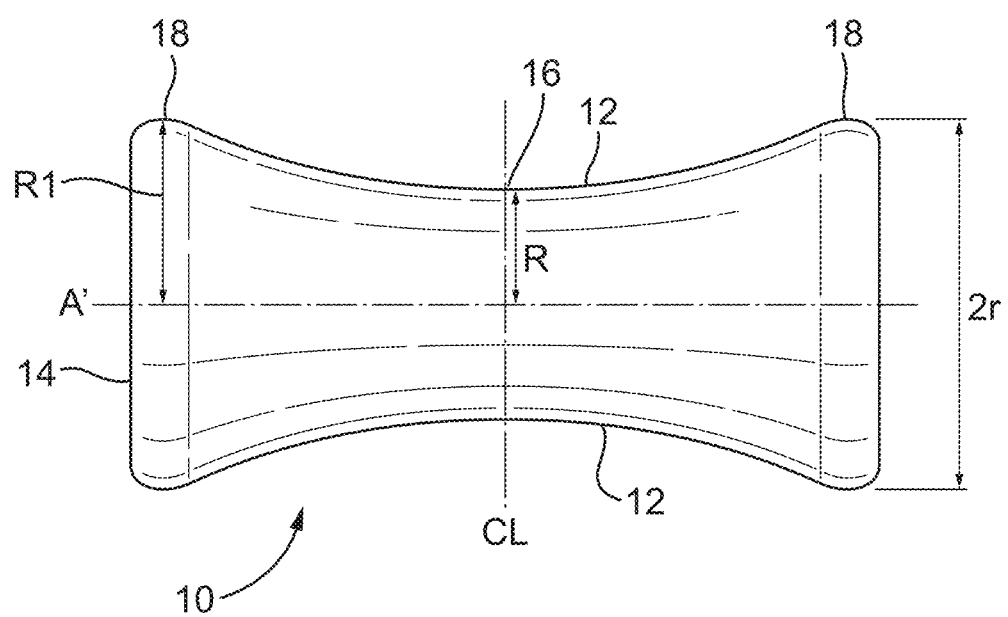
FIG. 2c is a schematic side view of a concave rolling element.

FIG. 2c shows the concave side profile 12 of a concave roller 10 that extends continuously between its circular ends 14. The roller axis A' passes through the centre of the circular ends 14. The circular ends 14 have the same diameter 2r. It may be seen that, in a main portion 16 of the roller 10, the concave side profile 12 has a radius R that is a minimum at the centre line CL of the single row of rollers 10 and increases towards the circular ends 14. In the end portions 18, the concave side profile 12 has a maximum end radius R1 that decreases until R=r at the circular ends 14. The end portions 18 therefore provide a smooth transition between the concave side profile 12 and the circular ends 14. As the roller 10 is symmetrical, both end portions 18 have the same end radius R1.

FIGS. 2a and 2b show a cage ring 40 forming cages between the concave rollers 10. It can be seen from FIG. 2b that each cage in the ring 40 follows the concave side profile 12 of the concave rollers 10 and has a thickness Z defined circumferentially along the single row of concave rollers 10. The single row of concave rollers 10 has a centre line CL passing circumferentially between the outer and inner rings, and the cage thickness Z is a maximum at the centre line CL. By comparing FIGS. 1b and 2b, it can be seen that the cage thickness Z between the concave rollers 10 is greater than in conventional spherical roller bearings, for example up to 15% greater.

Figure 3A:
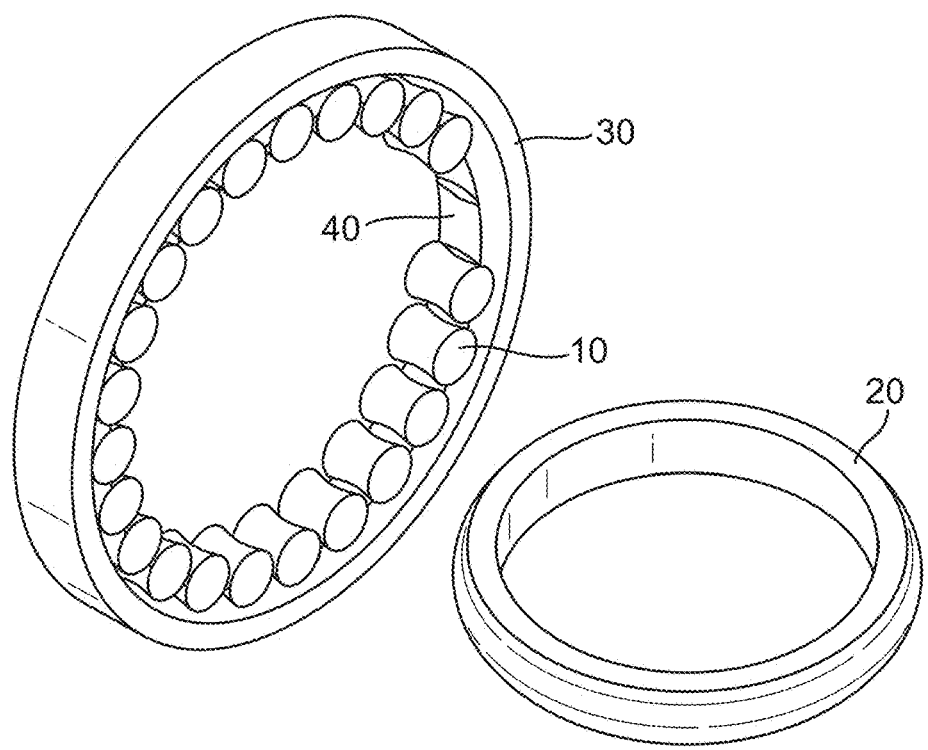
FIGS. 3a-3d schematically illustrate an exemplary method of assembly for a roller bearing according to an example of the present disclosure.
Figure 3B:
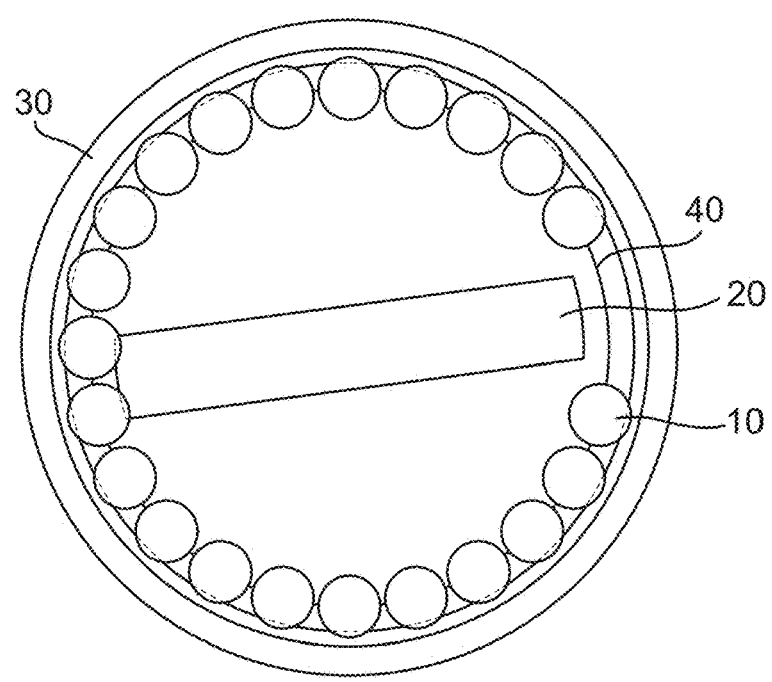
Figure 3C:
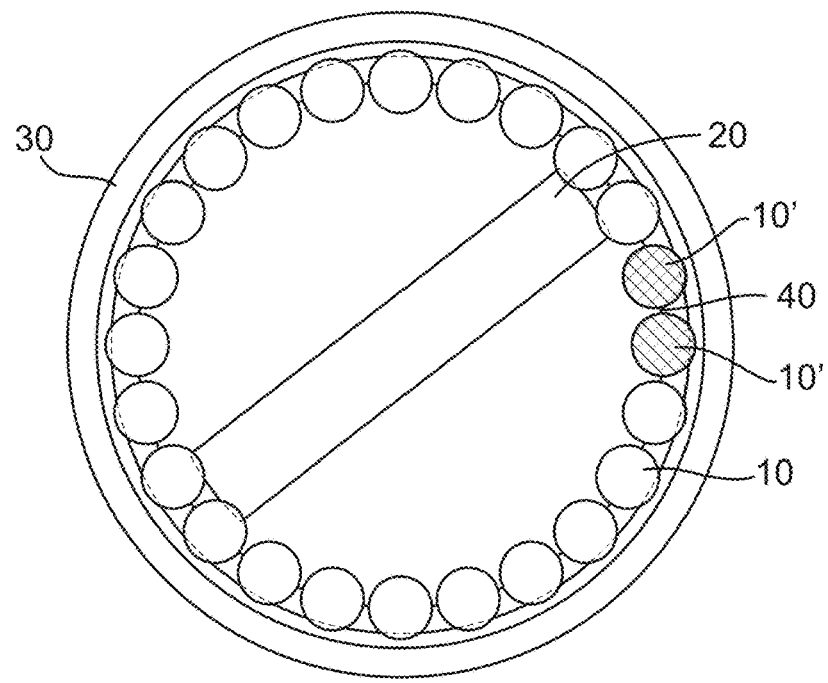
Figure 3D:
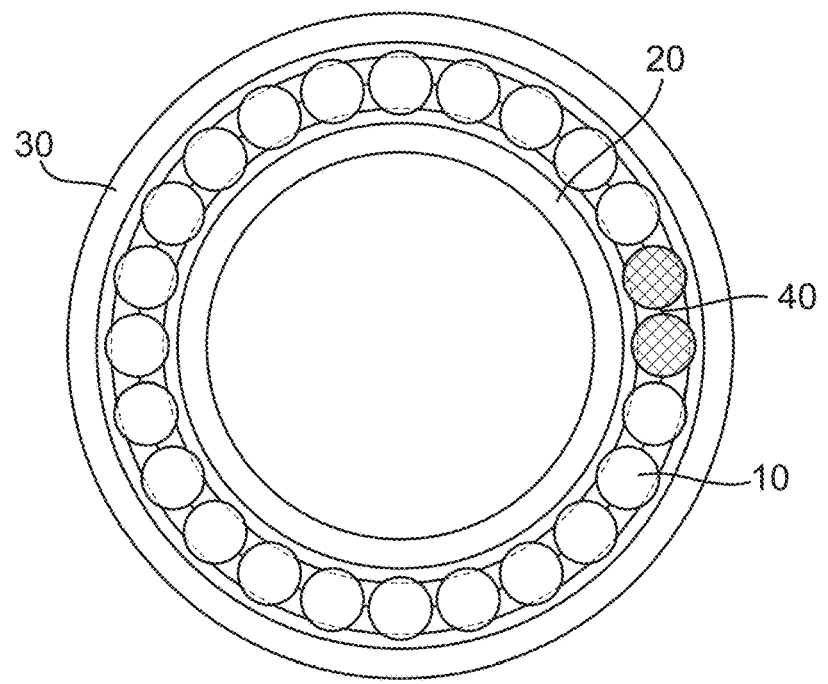

FIGS. 3a to 3d illustrate how the concave rollers 10 can be assembled with the inner and outer rings 20, 30 that define a toroidal raceway. As is clearly seen already in FIG. 2a, the toroidal inner and outer raceways each have a convex race surface for engaging the concave rollers 10. In FIG. 3a, two of the cages in the ring 40 are left empty when the concave rollers 10 are assembled inside the outer ring 30. In FIG. 3b, the inner ring 20 is placed inside the outer ring 30, perpendicular to its plane of orientation. In FIG. 3c, the two missing rollers 10' are added to the empty cages in the cage ring 40. In FIG. 3d, the inner ring 20 is rotated into the plane of the outer ring 30 to complete the final roller bearing assembly. In this final step, the inner ring 20 is rotated to get all planes of the bearing components such as inner ring 20, outer ring 30, and bearing cage ring 40, together parallel to each other.

The invention claimed is:

1. A roller bearing comprising:
an inner ring defining a toroidal inner raceway rotatable about a bearing axis;
an outer ring defining a toroidal outer raceway rotatable about the bearing axis; and
a plurality of concave rolling elements arranged in a single row between the outer and inner rings;
wherein each of the plurality of concave rolling elements is a symmetrical cylindrical roller having circular ends, a roller axis passing through the centre of the circular ends, and a concave side profile that extends continuously between the circular ends, the roller axis being aligned with the bearing axis; and
wherein the toroidal inner and outer raceways each have a convex race surface that continuously engages the concave side profile between the circular ends of each concave rolling element with a first radius and extends axially beyond the circular ends of each concave rolling element with a second radius that is less than the first radius.

2. The roller bearing of claim 1, wherein each concave rolling element comprises:
a main portion wherein the concave side profile has a radius R that increases from a centre line of the single row of concave rolling elements towards the circular ends having a diameter 2r; and
an end portion wherein the concave side profile has a radius R that decreases until R=r.

3. The roller bearing of claim 1, comprising a cage ring comprising a plurality of cages to house the concave rolling elements between the outer and inner rings.

4. The roller bearing of claim 3, wherein each cage follows the concave side profile of the concave rolling elements and has a thickness (z) defined circumferentially along the single row of concave rolling elements.

5. The roller bearing of claim 4, wherein the single row of concave rolling elements has a centre line passing circumferentially between the outer and inner rings, and the cage thickness (z) is a maximum at the centre line.

6. The roller bearing of claim 3, wherein the cage ring is made from steel.

7. The roller bearing of claim 3, wherein the cages are impregnated or coated with a solid lubricant.

8. The roller bearing of claim 1, wherein the concave rolling elements make full contact with the race surfaces all the way along the concave side profile between the circular ends.

9. A method of assembling the roller bearing of claim 1, the method comprising:
assembling some of the plurality of concave rolling elements inside the outer ring to form an incomplete single row of concave rolling elements defining a circumferential gap;
arranging the axis of the inner ring substantially perpendicular to the axis of the outer ring and aligning the inner ring with the circumferential gap;
positioning the inner ring inside the outer ring with the axis of the inner ring aligned with a diameter of the outer ring;
assembling a remainder of the plurality of concave rolling elements in the circumferential gap inside the outer ring to form a complete single row of concave rolling elements; and
rotating the inner ring into the plane of the outer ring and aligning the axis of the inner ring with the axis of the outer ring.

10. The method of claim 9, wherein the circumferential gap is at least as wide as the inner ring.

* * * * *